(12) United States Patent
Neumeier et al.

(10) Patent No.: US 9,299,209 B2
(45) Date of Patent: Mar. 29, 2016

(54) SUPER HIGH SPEED BOLT DELIVERY SYSTEM

(71) Applicant: Honda Motor Co., Ltd., Tokyo (JP)

(72) Inventors: Samuel J. Neumeier, Troy, OH (US); Joseph E. Dukehart, Elida, OH (US); Kurt Ehemann, Anna, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 378 days.

(21) Appl. No.: 13/804,650

(22) Filed: Mar. 14, 2013

(65) Prior Publication Data

US 2014/0263386 A1   Sep. 18, 2014

(51) Int. Cl.
*B25B 23/10* (2006.01)
*G07F 11/02* (2006.01)
*B23P 19/00* (2006.01)

(52) U.S. Cl.
CPC .............. *G07F 11/02* (2013.01); *B23P 19/001* (2013.01); *B25B 23/10* (2013.01)

(58) Field of Classification Search
CPC .......... B65H 5/00; B25B 23/04; B25B 23/10; B23P 19/001
USPC ................... 227/114; 81/57.37; 221/268, 251
See application file for complete search history.

(56) References Cited

U.S. PATENT DOCUMENTS

| 1,980,967 | A | | 11/1934 | De Mooy |
| 3,034,547 | A | * | 5/1962 | Cox, Jr et al. .................. 81/431 |
| 3,946,926 | A | | 3/1976 | Willis |
| 4,222,495 | A | * | 9/1980 | Kaneko .......................... 221/68 |
| 4,278,184 | A | | 7/1981 | Willis |
| 4,593,845 | A | | 6/1986 | Andersson et al. |
| 4,841,832 | A | * | 6/1989 | Snavely et al. ............. 81/57.37 |
| 5,014,876 | A | | 5/1991 | Young et al. |
| 5,088,359 | A | * | 2/1992 | Hockman .................... 81/57.37 |
| 5,098,003 | A | | 3/1992 | Young et al. |
| 5,218,189 | A | * | 6/1993 | Hutchison ..................... 235/439 |
| 5,733,089 | A | * | 3/1998 | Albright .................. 414/226.02 |
| 7,487,583 | B2 | * | 2/2009 | Craythorn et al. ............. 29/809 |
| 7,685,700 | B2 | * | 3/2010 | Dehlke et al. .................. 29/709 |
| 8,782,878 | B2 | * | 7/2014 | Morden et al. ................. 29/720 |

* cited by examiner

*Primary Examiner* — Timothy Waggoner
(74) *Attorney, Agent, or Firm* — Arent Fox LLP

(57) ABSTRACT

A method of dispensing bolts includes a step of forming a column of bolts on top of one another. The column includes an upper end and a lower end. A shank portion of each of the bolts is oriented toward the lower end. The method further includes steps of moving the column of bolts and dispensing a bolt at a time from the lower end. A bolt dispensing system is provided and includes a dispensing tube and a dispensing section. The dispensing section is located near an end of the dispensing tube and is configured to dispense bolts one at a time from the end.

19 Claims, 5 Drawing Sheets

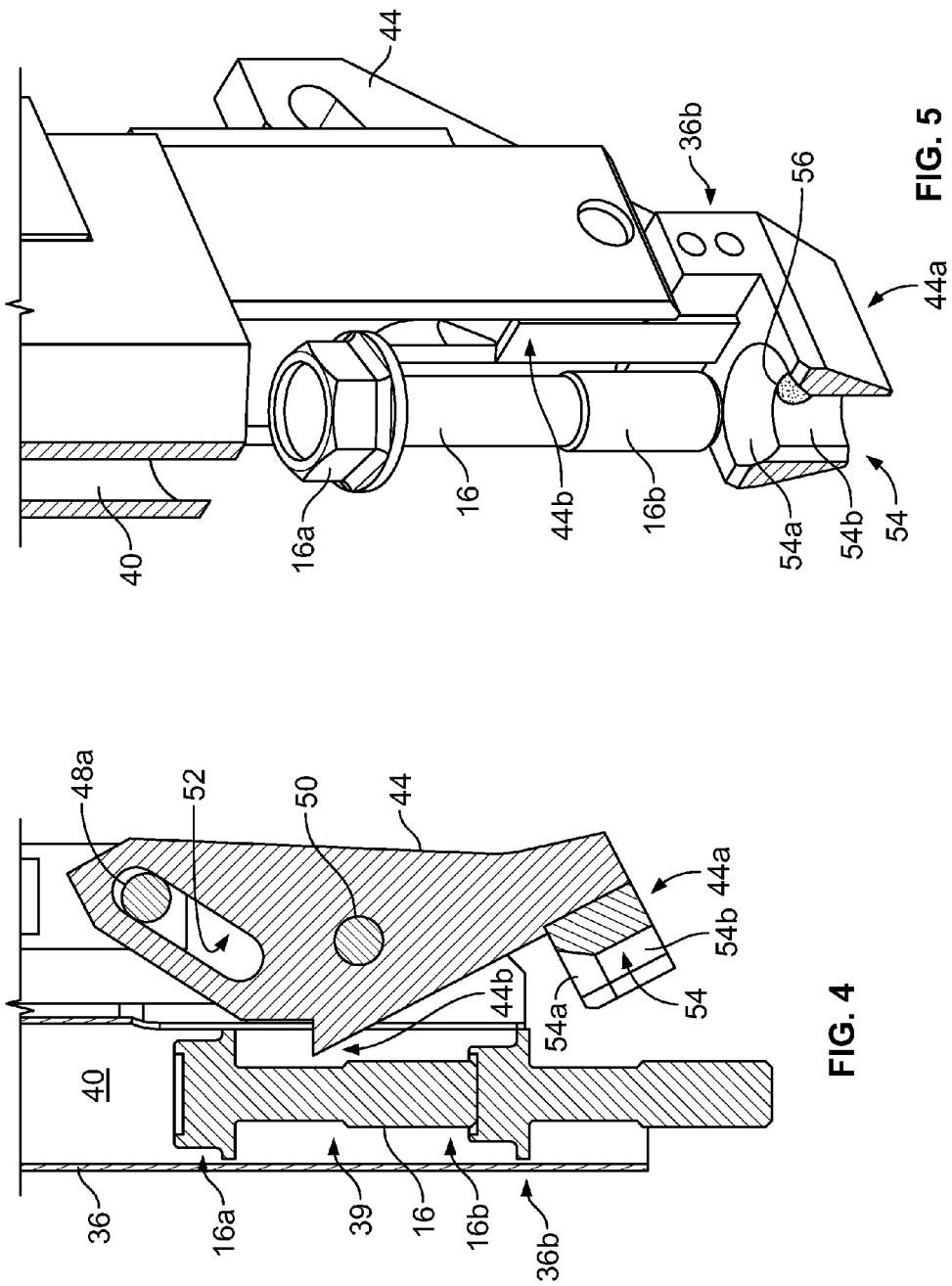

SUPER HIGH SPEED BOLT DELIVERY SYSTEM

TECHNICAL FIELD

The present disclosure relates to methods and an apparatuses for dispensing bolts and, more particularly, methods and systems for dispensing bolts into apertures formed on a work piece.

BACKGROUND

One manner of manufacturing a product in mass is through the use of an assembly line in which a work piece is moved through a number of stations and a specific set of components are mounted onto the work piece at each station. Such a manner of manufacturing involves moving the components from a feeder to the work piece at each station. While a single trip from the feeder to the work piece by an automated apparatus such as a robot may be sufficient to carry and mount one type of component on the work piece, it may not be possible to carry and mount a variety of components in a single trip and thus multiple trips may be necessary if conventional manufacturing techniques are used. For example, it may be difficult or impossible to configure the robot to carry and mount bolts or screws of different sizes or shapes onto the work piece efficiently in a single trip.

SUMMARY

In one example aspect, a bolt dispensing system is provided and includes a dispensing tube and a dispensing section. The dispensing tube includes a first end, a second end and a passage between the first end and the second end. The passage is configured to store a plurality of bolts to be supplied through the first end. The bolts inside the passage are arranged on top of one another in a column. A shank portion of each of the bolts is oriented toward the second end. The dispensing section is located near the second end of the dispensing tube and is configured to dispense bolts one at a time from the second end.

In another example aspect, a method of dispensing bolts includes a step of forming a column of bolts on top of one another. The column includes an upper end and a lower end. A shank portion of each of the bolts is oriented toward the lower end. The method further includes steps of moving the column of bolts and dispensing a bolt at a time from the lower end.

BRIEF DESCRIPTION OF THE DRAWINGS

These and other aspects are better understood when the following detailed description is read with reference to the accompanying drawings, in which:

FIG. 4 is a cross-sectional, side view across the dispensing tube and the dispensing section of the bolt dispensing system showing the pivoting member in a second position;

FIG. 5 is a perspective view of a second end of the bolt dispensing system shown without the dispensing tube.

DETAILED DESCRIPTION

Figure 1:
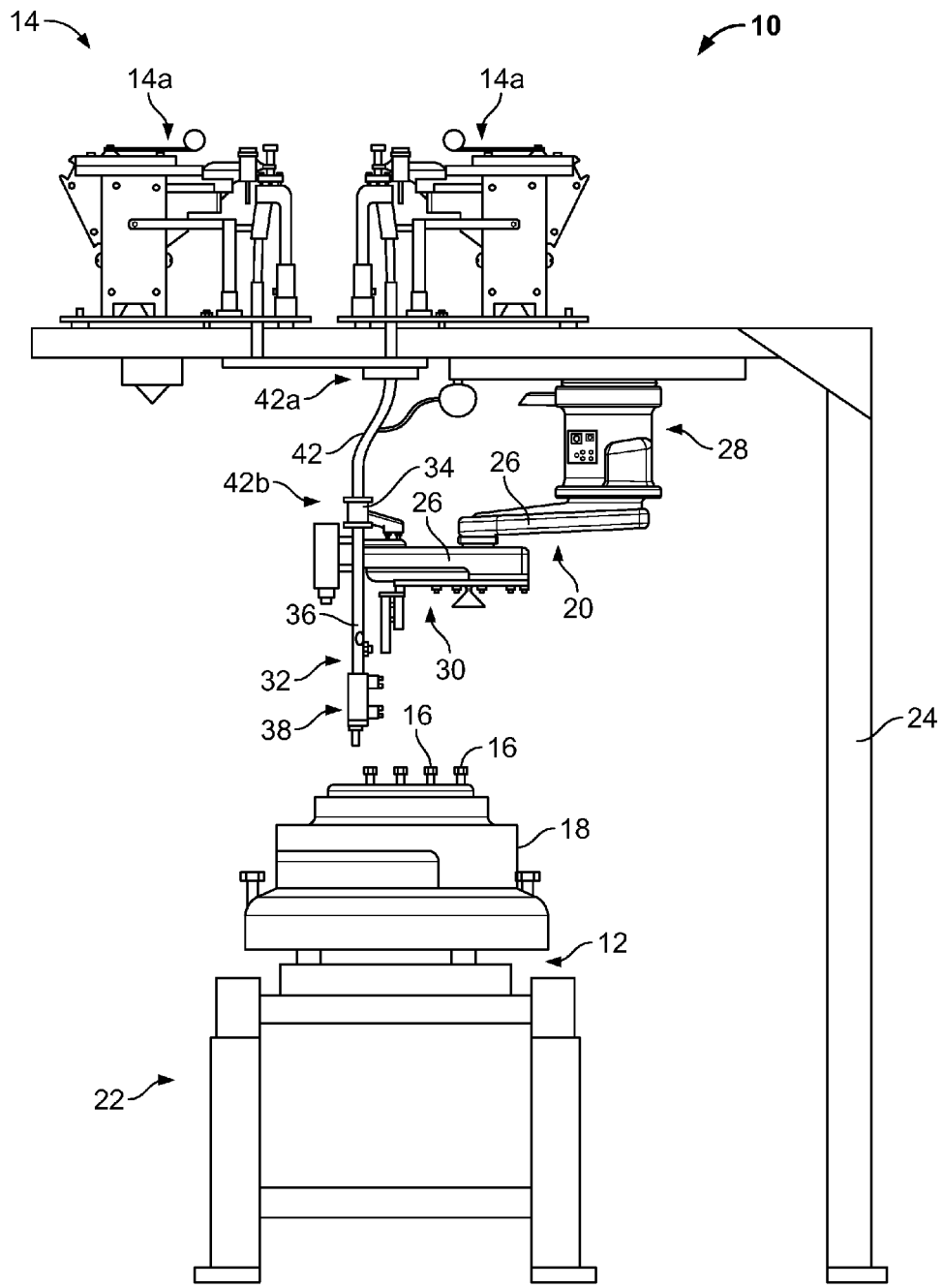
FIG. 1 is a side view of a first example embodiment of a manufacturing apparatus including a robotic arm connected to a bolt dispensing system and a first example work piece.

Examples will now be described more fully hereinafter with reference to the accompanying drawings in which example embodiments are shown. Whenever possible, the same reference numerals are used throughout the drawings to refer to the same or like parts. However, aspects may be embodied in many different forms and should not be construed as limited to the embodiments set forth herein.

Referring now to FIG. 1, an example embodiment of a manufacturing apparatus 10 is illustrated transporting bolts between a holding device 12 and a bolt loading station 14 for dispensing bolts 16 onto a work piece 18 that is secured to the holding device 12. The term "bolt" in the present disclosure should be construed to include any type of fastener that includes a head and a cylinder that extends from the head and may or may not be externally threaded, among others.

In the example embodiment of FIG. 1, the holding device 12 is adjoined by a single robotic arm 20 that moves about the work piece 18 although a plurality of robotic arms 20 may also be provided. The holding device 12 may be embodied to include a chuck, a lathe or the like and may be mounted on a conveying device 22 (e.g., a conveyor, a rail or the like) by way of which the holding device 12 can be moved along an assembly line. The conveying device 22 may allow the holding device 12 to stop at discrete locations along the conveying device 22 and be brought in proximity with one or more robotic arms 20 such that the work piece 18 secured by the holding device 12 may be worked on by a variety of apparatuses on the assembly line.

The system discussed herein may have similarities with the methods and apparatuses discussed in U.S. patent application Ser. No. 13/618,254 which is hereby incorporated by reference.

Figure 6:
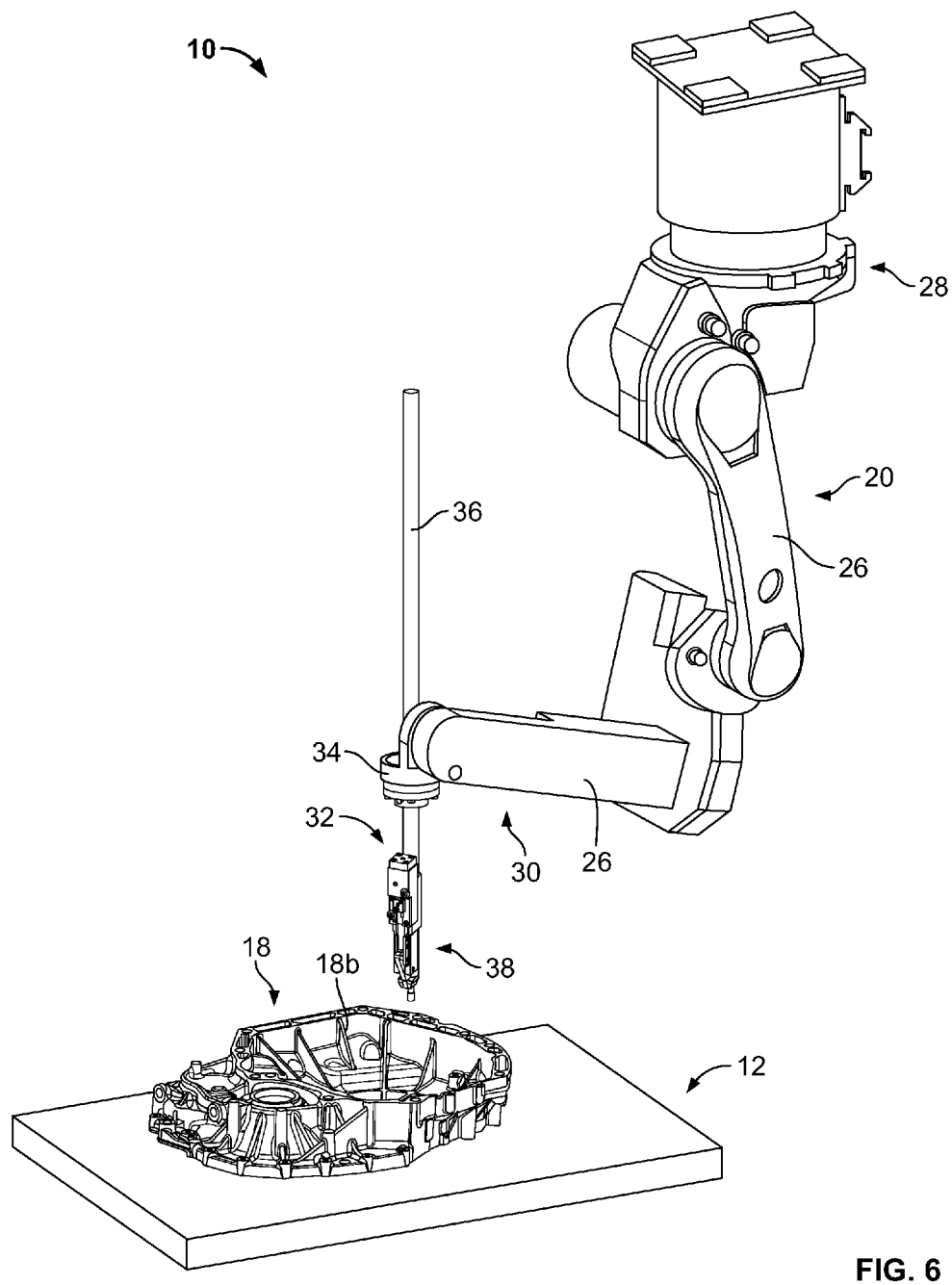
FIG. 6 is a perspective view of a second example embodiment of a manufacturing apparatus and a second example work piece.

In FIG. 1, the example robotic arm 20 is shown to be mounted at a fixed location but it may be possible to configure the robotic arm 20 to be movable, for example, by configuring a base 24 from which the robotic arm 20 extends to be movable. The robotic arm 20 may be embodied with members 26 connected by one or more joints that allow for movement with various degrees of freedom, similarly to a human arm, as conventionally known in the art. Specifically, the robotic arm 20 may include a proximal portion 28 and a distal portion 30 where the distal portion 30 is configured to be moved with respect to the proximal portion 28 which is mounted to the base 24. Depending on the manner in which the robotic arm 20 moves, the robotic arm 20 may be characterized as a Selective Compliant Assembly Robot Arm or Selective Compliant Articulated Robot Arm (SCARA) (FIG. 1) in which a bolt dispensing system 32, to be described below, is kept substantially vertical throughout the movements of the robotic arm 20. In terms of Cartesian coordinates, the bolt dispensing system 32 is kept substantially parallel to the z-axis throughout the movements of the robotic arm 20. Alternatively, as shown in FIG. 6, the robotic arm 20 may be a 6-axis robotic arm, a 7-axis robotic arm or the like in which the bolt dispensing system 32 is free to assume alternative orientations. It must be noted that various features of the manufacturing apparatus 10 are omitted in FIG. 6 for clarity of illustration.

The distal portion 30 may be configured to connect with a variety of devices for processing the work piece 18. The bolt dispensing system 32 of FIG. 2 may be one of such devices and is shown isolated from the robotic arm 20. The system 32 may include a mounting block 34, a dispensing tube 36 and a dispensing section 38. The system 32 is connected to the robotic arm 20 through the mounting block 34 which may be secured to the distal portion 30 by way of various means known in the art (e.g., bolts, screws, etc.). The dispensing tube 36 functions as a container for the bolts 16 and includes a first end 36a and a second end 36b with a passage 40 between the first end 36a and the second end 36b. The system 32 is connected to the distal portion 30 such that the dispensing tube 36 extends through the mounting block 34 and the first end 36a is free to be operatively connected with the bolt loading station 14. As shown in FIG. 1, the bolt loading station 14 may supply the bolts 16 that are assembled to the work piece 18.

In the present embodiment, the bolt loading station 14 is located above the robotic arm 20 and supplies the bolts 16 to the system 32 downward. The movement of the bolts 16 may be achieved by way of gravity such that the bolts 16 are simply dropped from the elevated bolt loading station 14. However, the bolt loading station 14 can also be located laterally adjacent to the robotic arm 20 and other methods of transporting the bolts 16 to the system 32 (for example, by way of air pressure) can be utilized under such configurations. As shown in FIG. 1, the bolt loading station 14 includes one or more bolt feeders 14a each of which supplies bolts 16 having a given set of dimensions. The bolts 16 from the bolt feeder 14a can be channeled through a chute that may be embodied as a flexible hose 42 with an upstream end 42a and a downstream end 42b. The bolts 16 may be funneled to the first end 36a of the dispensing tube 36. In case there are multiple bolt feeders 14a, the upstream end 42a of the flexible hose 42 may be moved between the bolt feeders 14a so that different types of bolts 16 can be supplied to the dispensing tube 36. For example, the dispensing tube 36 may be filled in such manner with bolts 16 that are equal in diameter but different in length. The downstream end 42b may be connected to the first end 36a of the dispensing tube 36.

Figure 3:
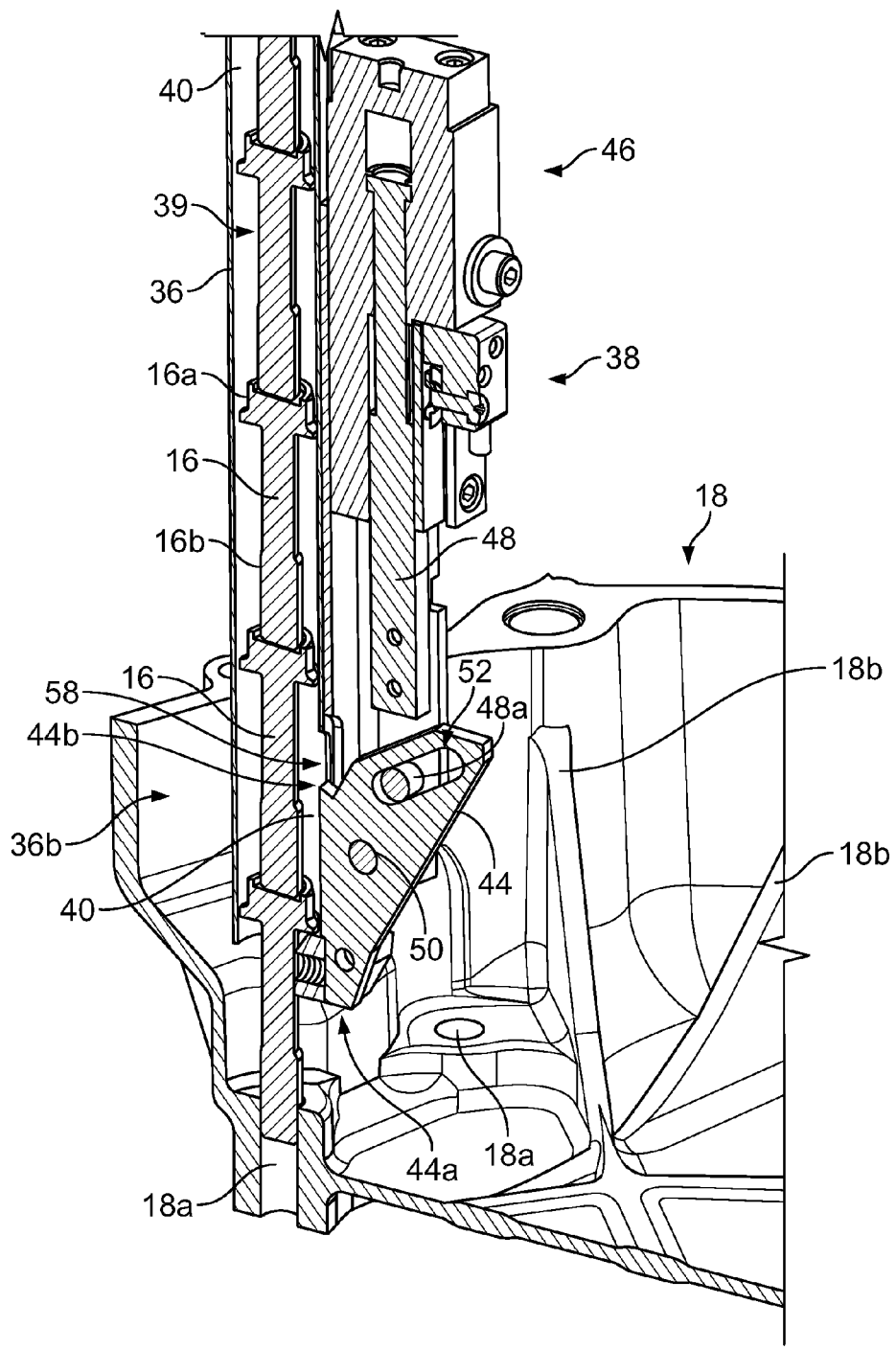
FIG. 3 is a cross-sectional, perspective view across a dispensing tube and a dispensing section of the bolt dispensing system showing a pivoting member in a first position.

As shown in FIG. 3, the dispensing section 38 of the bolt dispensing system 32 is an elongate box-like component that extends in an axial direction of the dispensing tube 36 and is located at the second end 36b of the dispensing tube 36 to control the dispensing of the bolts 16. The bolts 16 are arranged to form a column 39 inside the passage 40 with a head portion 16a of the bolts 16 oriented toward the first or upper end 36a and such that a shank portion 16b of the bolts 16 is oriented downward toward the second or lower end 36b of the dispensing tube 36. The dispensing section 38 may include a member 44 that pivots between a first position (FIG. 4) and a second position (FIG. 3) dispensing one of the bolts 16 from the second end 36b in the first position (FIG. 4) while securing the bolts 16 in the second position (FIG. 3). As shown in FIG. 3, the dispensing section 38 may include a reciprocating mechanism 46 that is operatively connected to the pivoting member 44 such that a reciprocating movement of an arm or piston 48 of the reciprocating mechanism 46 is turned into a pivoting movement of the pivoting member 44. Specifically, as shown in FIGS. 3-5, the pivoting member 44 may be a plate-like component and an intermediate portion of the pivoting member 44 may include a hole through which a pin 50 is inserted so that the pivoting member 44 can rotate around the pin 50. The pin 50 may be oriented to be substantially perpendicular to the dispensing tube 36. The pivoting member 44 may include a slot 52 that allows an end 48a of the piston 48 of the reciprocating mechanism 46 to be rotatably coupled to the pivoting member 44. Thus, as the piston 48 of the reciprocating mechanism 46 extends and retracts substantially parallel to the dispensing tube 36 thereby causing the end 48a of the piston 48 to move along the slot 52, the pivoting member 44 rotates about the pin 50. The reciprocating mechanism 46 may be controlled by a variety of methods known in the art such as a pneumatic, hydraulic or electrical means. The pivoting member 44 may include a first catch 44a and a second catch 44b that can extend into the passage 40 in the first position (FIG. 3) and the second position (FIG. 4) respectively. The first catch 44a may be embodied as a block with a semi-cylindrical recess 54 (FIG. 5) that can engage a bolt 16 and may include a frustoconical upper section 54a and a cylindrical lower section 54b.

Parts of the dispensing tube 36 are omitted from view in FIG. 5 in order to illustrate the recess 54. The first catch 44a may include a magnet 56 (FIG. 5) adjacent the recess to align the bolt 16 nearest the second end 36b. The dispensing tube 36 may be semi-cylindrical at the second end 36b so that the first catch 44a may surround the bolt 16. Moreover, the dispensing tube 36 may include a slit 58 (FIG. 3) through which the second catch 44b of the pivoting member 44 passes to extend into the passage 40 and engage a bolt 16. A bolt 16 nearest the second end 36b of the dispensing tube 36 may partially be accommodated in the recess 54 where the head portion 16a (FIG. 3) is caught by a top surface of the first catch 44a in the first position of the pivoting member 44 when the piston 48 of the reciprocating mechanism 46 is an extended position (FIG. 3). FIG. 4 shows the second position of the pivoting member 44 where, after the first catch 44a is disengaged from the bolt 16 nearest the second end 36b by the retraction of the piston 48 of the reciprocating mechanism 46, the bolt 16 nearest the second end 36b is dispensed by way of gravity and the head portion 16a of the bolt 16 that is second to nearest to the second end 36b can fall and be caught by the second catch 44b. Thereafter, as the pivoting member 44 is returned to the first position, the bolt 16 that is nearest the second position falls and is caught by the first catch 44a.

Figure 2:
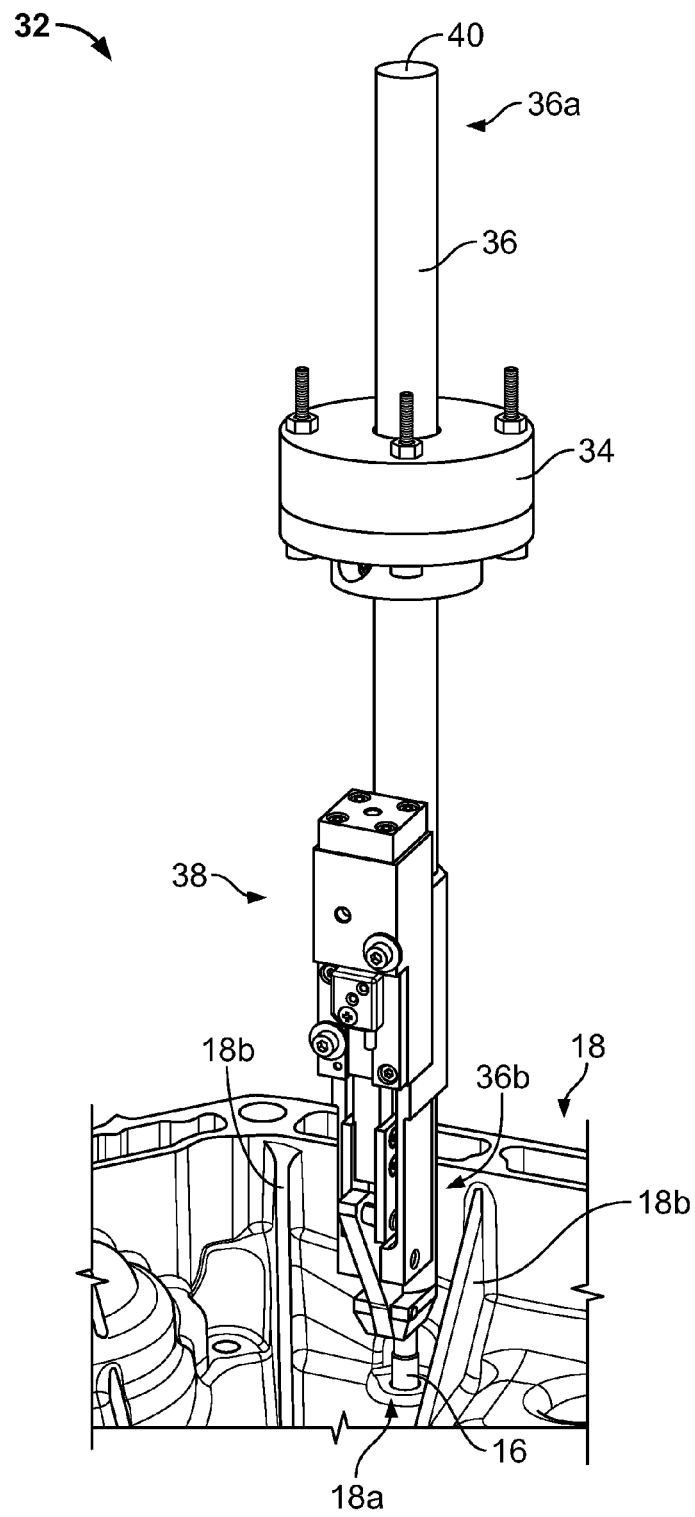
FIG. 2 is a perspective, close-up view of the bolt dispensing system dispensing a bolt into an aperture of the work piece.

As shown in FIGS. 2-3, the system 32 provides a compact, narrow geometry that is easy to move around the work piece 18. Because the dispensing section 38 is structurally configured to extend substantially parallel to the dispensing tube 36 and the cross-sectional area of the bolt dispensing system 32 is kept small, the bolt dispensing system 32 can easily access apertures that are located in tight spaces around the apertures 18a of the work piece 18. For example, as shown in FIG. 2, the apertures 18a on the work piece 18 may be located between protrusions 18b that may prevent a thicker or wider structure with a larger geometry from accessing the apertures 18a.

The bolt dispensing system 32 can be moved in a variety of ways to access the apertures 18a on the work piece 18 and the robotic arm 20 may move the dispensing tube 36 through a combination of translation, rotation about an axis or a point, etc. In one example, the dispensing section 38 may act as a hindrance to accessing an aperture 18a and the robotic arm 20 may rotate the dispensing tube 36 around the longitudinal axis of the dispensing tube 36. In other words, the dispensing tube 36 would be rotated around a rotational axis that is collinear with the longitudinal axis of the dispensing tube 36. In another example, the robotic arm 20 may move the dispensing tube 36 along the longitudinal axis of the dispensing tube 36. Depending on the orientation of the dispensing tube 36, this may result in movement of the dispensing tube 36 in vertical directions. The movement of the robotic arm 20 may be programmed into a controller and be expressed in various parameters describing three-dimensional movement. For example, the dispensing tube 36 may be kept parallel to the z-axis of the Cartesian coordinate system for a SCARA type robotic arm while the bolt dispensing system 32 is operated.

The operations involving the above-discussed bolt dispensing system 32 may be conducted as described below. The work piece 18 is mounted on the holding device 12 which may be brought under the robotic arm 20 provided with the bolt dispensing system 32. Bolts 16 are supplied from one or more of the feeders 14a of the bolt loading station 14 into the passage 40 of the dispensing tube 36 with the shank portion 16b (FIG. 3) of the bolts 16 oriented toward the second end 36b of the dispensing tube 36. The bolts 16 are thus stacked on top of one another so as to form a column 39 of bolts 16 inside the dispensing tube 36. The flexible hose 42 may be moved between one or more feeders 14a to form a column 39 of bolts 16 that may have a variety of dimensions, for example, differing only in length. Thereafter, the robotic arm 20 may move the column 39 of bolts 16 disposed inside the dispensing tube 36 to a plurality of apertures 18a formed on the work piece 18. The second end 36b of the dispensing tube 36 is brought in proximity with each aperture 18a such that the longitudinal axis of the dispensing tube 36 is aligned with the longitudinal axis of the aperture 18a. The bolts 16 are dispensed from the second, lower end 36b one at a time by the pivoting movement of the pivoting member 44 triggered by the reciprocating mechanism 46. Specifically, as the pivoting member 44 is pivoted from the first position (FIG. 4) to the second position (FIG. 3), the bolt 16 nearest the second, lower end 36b is released by the first catch 44a and is dispensed thereby allowing the bolt 16 directly above to move downward. Also, while the pivoting member 44 is in the second position (FIG. 3), the second catch 44b engages the bolt 16 that was directly above the dispensed bolt 16. As the pivoting member 44 is pivoted back to the first position (FIG. 4), the bolt 16 is released by the second catch 44b and is engaged by the first catch 44a near the second end 36b. The bolt loading station 14 may be configured to fill the void created inside the passage 40 near the first end 36a of the dispensing tube 36 by adding a bolt 16 to the column 39 as the column 39 of bolts 16 proceeds toward the second end 36b of the dispensing tube 36. The order of the apertures 18a through which the column 39 of bolts 16 is moved may be determined by the order in which the different types of bolts 16 are stacked in the column 39 so that each bolt 16 is inserted into a corresponding aperture 18a. After the bolts 16 are inserted into appropriate apertures 18a, the bolts 16 can be fastened about the work piece 18 by another device such as a robotic arm with a screw driving capability, or they can be fastened manually, if desired.

Such dispensing and refilling steps are repeated for each aperture 18a as the bolt dispensing system 32 is moved around the work piece 18. The orientation of the dispensing tube 36 corresponding to each of the apertures 18a is incorporated into a controller for the robotic arm 20 so that dispensing of bolts 16 can occur while avoiding contact between the bolt dispensing system 32 and the work piece 18.

It will be apparent to those skilled in the art that various modifications and variations can be made without departing from the spirit and scope of the claimed invention.

What is claimed is:

1. A bolt dispensing system, comprising:
   a dispensing tube including a first end, a second end, and a passage between the first end and the second end, the passage configured to store a plurality of bolts to be supplied through the first end, the bolts inside the passage arranged on top of one another in a column, a shank portion of each of the bolts oriented toward the second end, wherein the dispensing tube further includes a pivoting member configured to pivot between a first position and a second position, and a reciprocating mechanism disposed parallel to the dispensing tube so that an arm of the reciprocating mechanism is configured to extend and retract substantially parallel to the dispending tube, the pivoting member further comprises a slot by which an end of the arm is coupled to the pivoting member, and the pivoting member is configured to pivot between the first position and the second position as the end of the arm moves along the slot; and
   a dispensing section located near the second end of the dispensing tube and configured to dispense bolts one at a time from the second end.

2. The system of claim 1, wherein the pivoting member is configured to extend into the passage and engage a bolt that is nearest in the first end in the first position, and the pivoting member is configured to extend into the passage and engage a bolt that is second to nearest in the second end in the second position.

3. The system of claim 2, wherein the pivoting member comprises a first catch and a second catch, and the pivoting member is configured to pivot about an axis perpendicular to the dispensing tube such that the first catch extends into the passage in the first position and the second catch extends into the passage in the second position.

4. The system of claim 3, wherein the dispensing tube further comprises a slit formed near the second end, and the second catch is configured to extend into the slit in the second position.

5. The system of claim 3, wherein the first catch is shaped to accommodate a bolt and including a magnet configured to align a bolt.

6. The system of claim 1, wherein the dispensing tube is defined by a longitudinal axis and mounted to a robotic arm including a proximal portion and a distal portion, the distal portion is configured to be moved with respect to the proximal portion and configured to connect with the system, and the robotic arm is configured to rotate the dispensing tube around the longitudinal axis of the dispensing tube.

7. The system of claim 6, wherein the robotic arm is configured to move the dispensing tube along the longitudinal axis.

8. The system of claim 1, further comprising at least one bolt feeder configured to supply bolts to the first end of the dispensing tube.

9. The system of claim 1, further comprising a plurality of bolt feeders and a flexible hose including an upstream end and a downstream end, wherein the upstream end is configured to be moved between the plurality of bolt feeders and the downstream end is connected to the first end of the dispensing tube.

10. A method of dispensing bolts, the method comprising:
    providing a dispensing tube having a pivoting member, a reciprocating mechanism, a first end, and a second end, a passage between the first and second ends;
    using the passage to store a plurality of bolts to be supplied through the first end, the bolts inside the passage arranged on top of one another in a column, a shank portion of each of the bolts oriented toward the second end;
    disposing the reciprocating mechanism parallel to the dispensing tube so that an arm of the reciprocating mechanism is configured to extend and retract substantially parallel to the dispending tube;
    providing, in the pivoting member, a slot by which an end of the arm is coupled to the pivoting member;
    pivoting the pivoting member between a first position and a second position as the end of the arm moves along the slot; and positioning a dispensing section to be located near the second end of the dispensing tube for dispensing bolts one at a time from the second end.

11. The method of claim 10, further comprising adding a bolt to the column on an upper end of the column for each of the bolts dispensed from a lower end of the column.

12. The method of claim 10, further comprising aligning the column of bolts with respect to an aperture of a work piece such that a bolt is configured to be inserted into the aperture during dispensing.

13. The method of claim 12, further comprising:
supplying the bolts through the dispensing tube, the column of bolts disposed inside the passage such that an upper end of the column is near the first end and an lower end of the column is near the second end.

14. The method of claim 13, further comprising:
dispensing the bolts through the dispensing section; and avoiding contact between the dispensing section and the work piece.

15. The method of claim 13, further comprising:
supplying a first type of bolt through the first end; and supplying a second type of bolt with a different dimension than the first type of bolt through the first end.

16. The method of claim 10, wherein dispensing bolts one at a time includes disengaging a first bolt engaged at a lower end of the column such that the first bolt is dispensed by way of gravity and engaging a second bolt moving toward the lower end.

17. The method of claim 10, wherein the column is defined by a longitudinal axis, and the method further comprises moving the column by rotating the column around the longitudinal axis.

18. The method of claim 17, wherein moving the column includes moving the column by way of translation.

19. A bolt dispensing system, comprising:
a dispensing tube including a first end, a second end and a passage between the first end and the second end, the passage configured to store a plurality of bolts to be supplied through the first end, the bolts inside the passage arranged on top of one another in a column, a shank portion of each of the bolts oriented toward the second end, wherein the dispensing tube further includes a pivoting member configured to pivot between a first position and a second position, and a reciprocating mechanism disposed parallel to the dispensing tube so that an arm of the reciprocating mechanism is configured to extend and retract substantially parallel to the dispending tube, the pivoting member further comprises a slot by which an end of the arm is coupled to the pivoting member, and the pivoting member is configured to pivot between the first position and the second position as the end of the arm moves along the slot; and
a member disposed near the second end of the dispensing tube and including a first catch and a second catch, wherein the first catch is configured to engage a bolt near the second end of the dispensing tube in the first position, the second catch is configured to engage a bolt closer to the first end of the dispensing tube in the second position, and the member is configured to move between a first position and a second position such that a bolt is dispensed from the second end as the member is moved from the first position to the second position.

* * * * *